UNITED STATES PATENT OFFICE.

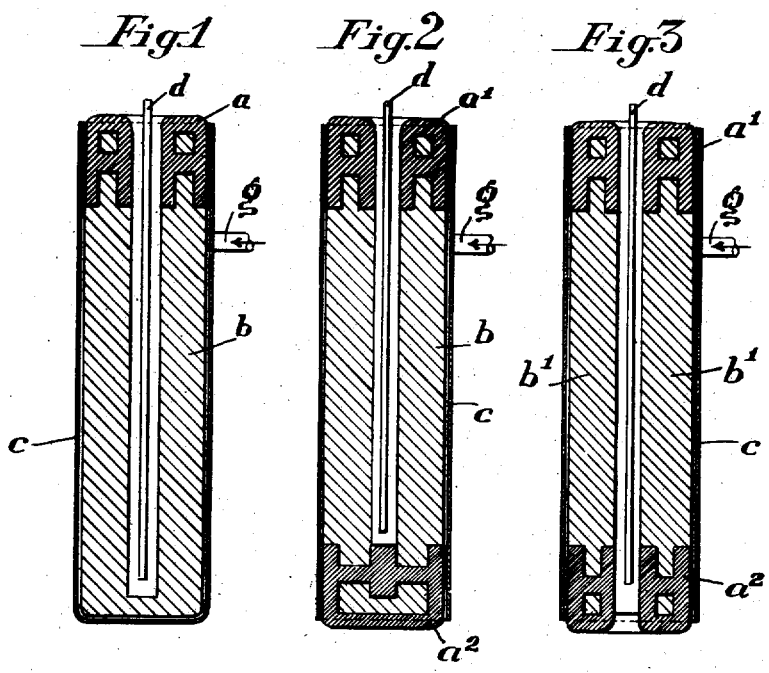

STEPHAN BENKÖ, OF BUDAPEST, AUSTRIA-HUNGARY, ASSIGNOR TO COMPANY LIMITED FOR EXPLOITATION OF INVENTIONS BY STEPHEN BENKÖ, OF BUDAPEST, AUSTRIA-HUNGARY.

HOLLOW CARBON ELECTRODE FOR GALVANIC ELEMENTS.

974,016. Specification of Letters Patent. Patented Oct. 25, 1910.

Original application filed January 19, 1909, Serial No. 473,047. Divided and this application filed March 25, 1910. Serial No. 551,567.

*To all whom it may concern:*

Be it known that I, STEPHAN BENKÖ, a subject of the King of Hungary, residing at Budapest, in Austria-Hungary, have invented certain new and useful Improvements in Hollow Carbon Electrodes for Galvanic Elements, of which the following is a specification.

In galvanic elements in which an electrolyte, contained in the hollow or recess of a porous carbon electrode, is guided through the walls of the same, the collecting of current causes some difficulties, and it is the object of the present invention to overcome the same; the present application being a division of my original application Serial No. 473047 January 19th 1909.

According to the invention the whole carbon electrode is provided with a metal casing resisting acids, in such manner that an intermediate space is left between the metal and the carbon which is filled by the electrolyte introduced under pressure from the outside, in order to be passed through the pores of the carbon into the recess or hollow space of the same. Owing to this arrangement, the whole element is surounded by a liquid contact, so that the discharge of the current into the outer pipe can be effected with a very slight resistance. The most suitable way is to solder the metal coating in an airtight manner to the metal cap closing the carbon recess and which is preferably cast on to it.

Hitherto the current was collected from the carbon electrode, by arranging on the head portion of the same metal contacts, for instance, binding screws. According to this invention the current is not only carried farther on by means of these metal current collecting devices but also passes from the zinc electrode through the whole cross-sectional area of the carbon impregnated with liquid, and through the liquid under pressure, contained between the carbon and the metal coating, to the metal coating, so that current can be collected and carried into the outer conductors from the whole surface of the metal coating. One pole of the element is, therefore, constituted by any desired outside point of the same, while the other pole is arranged in the interior of the element and insulated from the same.

Some constructions of the hollow carbon bodies according to this invention are illustrated in the accompanying drawings.

According to the device shown in Figure 1, the metal crown or rim $a$ forming the contact, has soldered to it a metal plate $c$ covering the whole carbon body $b$, a space closed in an air- and liquid-tight manner thus being produced between the metal plate and the carbon body. $d$ is the zinc body.

In the construction illustrated in Fig. 2, a hollow carbon body $b$, is also shown in the interior of which is arranged the zinc body $d$. In that construction there are two metal rims $a'$ and $a^2$. The hollow space formed by the metal coating $c$, is produced in this case simply owing to the plate $c$ being soldered to the upper and bottom contacts. Depolarizing electrolytic liquid or gas is introduced into the intermediate space between the carbon and the casing through a pipe $g$. It will be seen that this element can also be operated by suction, in which case the inner hollow space or recess of the carbon with the soluble electrode must be closed, so that the excess of pressure due to the vacuum produced, drives the electrolytic liquid together with the depolarizing gas contained therein through the pipe $g$ into the hollow space between the carbon and the coating, and thence into the pores of the carbon, and finally through the latter into the hollow space of the carbon to the soluble electrode.

Fig. 3 shows an element similar to that illustrated in Fig. 1, with the difference that the cell according to Fig. 3 is made of two carbon plates, in such manner that each single carbon plate $b'$ is provided at its four edges with a metal contact. When the metal rims of these plates are soldered together so that there is left between the plates a hollow space for the zinc electrode $d$, an element practically similar to those previously described, can be produced by covering with the metal coating $c$.

The expression "carbon electrode" is meant to include throughout retort carbon, or graphite, or a mixture with braunstein or manganese dioxid of any two, or all of these substances.

What I claim as my invention and desire to secure by Letters Patent is:—

1. A galvanic element comprising a hollow porous negative electrode provided with perforations extending completely therethrough, a positive electrode inserted in the hollow of said negative electrode, an electrolyte containing a depolarizing gas, a metal rim attached to the negative electrode by being compressed into said perforations, an acid-resisting casing carried by said rim and completely inclosing the outer surface of the negative electrode, but being situated a small distance from said surface so as to form an inclosed space therearound, means opening into said space for admitting the electrolyte containing the depolarizing gas, and means for passing said electrolyte and depolarizing gas simultaneously from the said space through the pores of the negative electrode to the positive electrode.

2. A galvanic element comprising a hollow porous negative electrode provided with perforations extending completely therethrough, a positive electrode inserted in the hollow of said negative electrode, an electrolyte containing a depolarizing gas, a metal rim attached to each end of the negative electrode by being compressed into said perforations, an acid resisting casing carried by said rims and completely inclosing the outer surface of the negative electrode, but being situated a small distance from said surface so as to form an inclosed space therearound. means opening into said space for admitting the electrolyte containing the depolarizing gas, and means for passing said electrolyte and depolarizing gas simultaneously from the said space through the pores of the negative electrode to the positive electrode.

In testimony whereof I have signed my name to this specification in the presence of two subscribing witnesses.

STEPHAN BENKÖ.

Witnesses:
 ERNEST MELLER,
 HUGH KEMÉNY.